May 23, 1961  W. T. PETERSON  2,985,812
ENCAPSULATED POWER SUPPLY
Filed Jan. 23, 1958
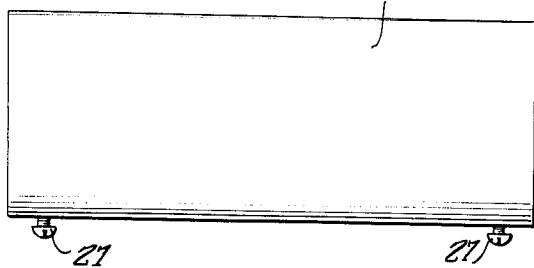
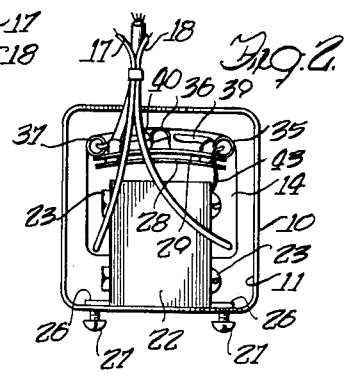
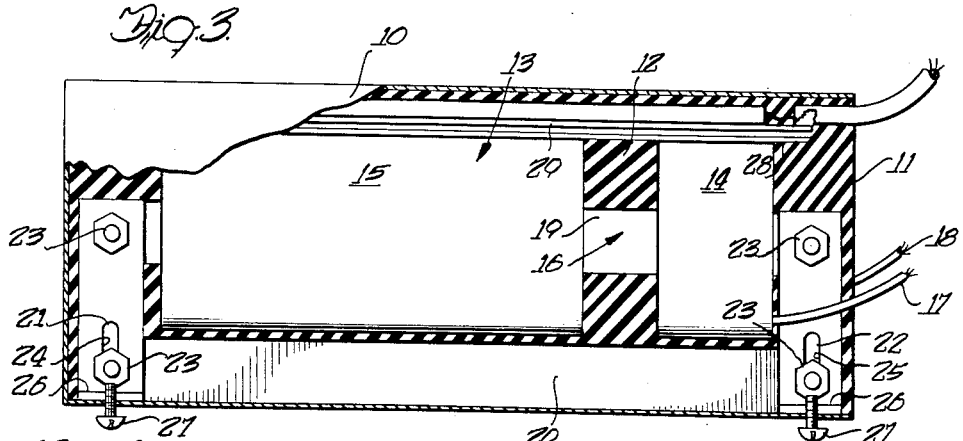
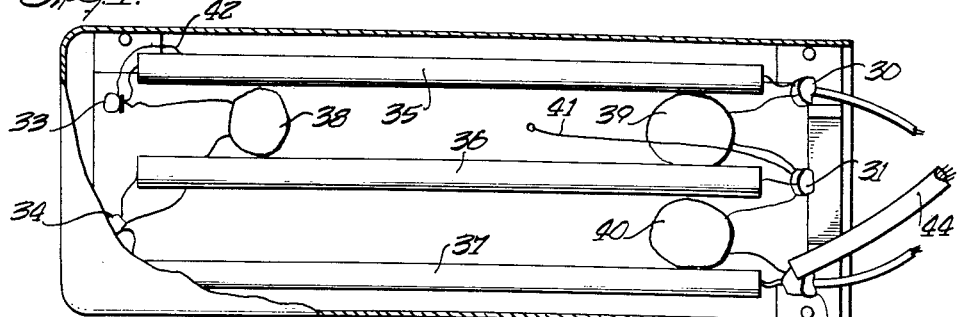
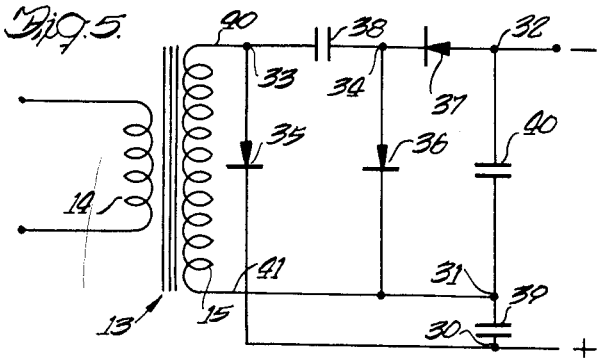
Inventor
Wilbert T. Peterson
By: John W. Graham
Attorney

United States Patent Office 2,985,812
Patented May 23, 1961

2,985,812

ENCAPSULATED POWER SUPPLY

Wilbert T. Peterson, McHenry, Ill., assignor to Skysweeper, Inc., McHenry, Ill., a corporation of Illinois Filed Jan. 23, 1958, Ser. No. 710,637

6 Claims. (Cl. 321—15)

This invention relates to a power supply, and more especially to an encapsulated power supply operative to produce a relatively high D.C. output voltage at low current.

There are many environments wherein a small, compact power supply capable of producing a high D.C. voltage output is either necessary or desirable. An example thereof are electrostatic air cleaners suitable for the consumer market, for such air cleaners require a power supply having an output in the order of 10,000 to 12,000 volts, although the current drain is fairly low and may be considerably less than two milliamperes, and space limitations in the home impose serious dimensional problems. As yet, electrostatic filters or cleaners have not enjoyed popularity in the consumer market but, rather, their use for the most part has been limited to industrial installations. One of the reasons for this is that space limitations are often not as critical in industrial applications as in the home, and at present, the power supply units used in conjunction with electrostatic cleaners are quite large, consequently making such filters unsuitable for the consumer market.

Though a deterrent in developing the home filter market, large-sized power supplies have been compelled by the design of units capable of producing the requisite voltages. In view of this, an object of the present invention is to provide a small, compact power supply capable of producing relatively high D.C. output voltages and, therefore, especially suited for use with electrostatic air cleaners intended for the consumer market, whereby such market can now be exploited.

Another object of the invention is in the provision of an encapsulated D.C. power supply able to develop voltages of from 10,000 to 15,000 volts at a current of from several hundred microamperes to a maximum of about two milliamperes under short circuit conditions. Still another object is that of providing a power supply of the type described, comprising a transformer in combination with a voltage rectifier and multiplication circuit, and in which the requisite circuit components are oriented with respect to each other so as to accord a unit of small dimensions as, for example, 6" x 2" x 2⅝".

Yet a further object is in the provision of a D.C. power supply, defined by an iron core transformer having primary and secondary windings spaced axially along the iron core thereof, by elongated solid state rectifiers extending in spaced apart relation along the length of the transformer and in substantial adjacency with the windings thereof, and by capacitors nested between adjacent rectifiers; the entire unit being enclosed in a metal container filled with a high dielectric material intimately encapsulating the various components. Additional objects and advantages of the invention will become apparent as the specification develops.

Embodiments of the invention are illustrated in the accompanying drawing, in which—

Figure 1 is a side view in elevation of the power supply unit; Figure 2 is an end view in elevation of the unit shown in Figure 1, but with the encapsulating dielectric removed to reveal the orientation of the components; Figure 3 is essentially a longitudinal sectional view of the unit illustrated in Figure 1, but showing the encapsulating dielectric; Figure 4 is a top plan view, with the uppermost wall of the container broken away and with the encapsulating material removed; and Figure 5 is a schematic circuit diagram of the power supply.

The components of the power supply are encased within a can-like container or shell 10, preferably made of metal. The container 10 is open-ended as shown at 11 in Figures 2 and 3, so that the components of the power supply can be inserted thereinto. After such insertion, the container is completely filled with an encapsulating material 12 which is initially in a fluid state, but which is cured or hardened within the container. The encapsulating material should have a high dielectric capacity, and is preferably a polyester resin that when cured is solid but not brittle.

As shown most clearly in Figure 3, a transformer designated generally with the numeral 13 is mounted within the container 10, and comprises a primary winding 14, a secondary winding 15 and an iron core 16. The transformer 13 functions to step up the voltage, and consequently the secondary winding 15 has a much greater number of turns than the primary. In one specific example, the secondary winding 15 produces 3,800 volts when 117 volts A.C. is applied across the primary winding 14. The primary winding 14 is equipped with input leads 17 and 18 adapted to have a conventional male plug (not shown) connected to the ends thereof for insertion into an ordinary convenience outlet.

The core 16 is preferably of laminated construction, as shown best in Figure 2, and defines a closed magnetic circuit since it is of rectangular configuration. For identification, the elongated core segments are denoted with the numerals 19 and 20, while the ends thereof are designated with the numerals 21 and 22. The laminations may be clamped together by any suitable means, such as the nut and bolt assemblies 23; and preferably, the ends 21 and 22 have elongated slots 24 and 25, respectively, at one end thereof to permit an adjustable securance of the core segment 20 thereto. As seen in Figure 2, the outer laminations of the end 21 or end 22 (or, more particularly, the clamping plates thereof) are generally L-shaped, and provide laterally extending ears 26 each having a threaded aperture therein adapted to receive cap screws 27 which extend through openings therefor in the bottom wall of the casing 10. The cap screws 27 may be used in mounting the power supply unit, and serve also to anchor the transformer with respect to the container 10.

The primary and secondary windings of the transformer have substantially the same cross sectional area, and are oriented in spaced apart relation along the axis of the core 16 or, more specifically, the axis of the segment 19 thereof. Extending along the periphery of the primary and secondary windings is a fiber or plastic insulating panel 28 having superposed thereon a terminal-equipped panel 29. The panel 29 has three solder terminals (Figure 4) 30, 31 and 32 at one end thereof, and a pair of solder terminals 33 and 34 adjacent the opposite end thereof. The insulating panel 28 separates the underside of such terminals from the transformer windings.

A plurality of solid state rectifiers lie along the surface of the mounting panel 29 in spaced apart relation—there being three in number in the specific illustration, designated respectively with the numerals 35, 36 and 37. The components 35 through 37 may be selenium rectifiers and are of narrow, elongated configuration extending substantially from end to end of the spaced transformer windings 14 and 15. The rectifier 35 is connected between the terminals 30 and 33, the rectifier 36 between the terminals 31 and 34, and rectifier 37 between terminals 32 and 34.

Mounted between the adjacent rectifiers 35 and 36 is a capacitor 38 connected between the terminals 33 and 34, and a capacitor 39 connected between the terminals 30 and 31. Similarly, a capacitor 40 is mounted adjacent rectifiers 36 and 37 and is connected between the terminals 31 and 32. All of the capacitors are nestingly received between the respective rectifiers, and are thin members as shown in Figure 2, so that they do not extend substantially above the upper dimensional limits of the rectifiers.

The secondary winding 15 of the transformer is connected between the terminals 31 and 33, respectively, through the leads 41 and 42. The output of the power supply is taken across the terminals 30 and 32, which are positive and negative respectively. Preferably, the positive terminal 30 is grounded, as shown in Figure 2, through lead 43, and the terminal 32 may be equipped with a lead 44. Thus, in connecting an electrostatic air cleaner to the power supply, certain of the elements of the cleaner are connected to the lead 44, and the remaining elements connected directly to the container 10, ordinarily through the mounting thereof upon the frame of the cleaner.

The schematic circuit diagram for the power supply is illustrated in Figure 5, and it is apparent that the output voltage of the secondary winding 15 is rectified by the elements 35, 36 and 37. These rectifier elements, in association with the capacitors 38, 39 and 40, define a voltage multiplication circuit; and in the specific illustration, the multiplication factor is three. Thus, in one specific embodiment of the invention, capable of providing 3,800 volts across the secondary winding 15 with an input voltage to the primary winding of 117 volts, a rectified voltage was obtained across the terminals 30 and 32 approximating 11,000 volts at open circuit. In the specific embodiment referred to, the capacitors 38, 39 and 40 each had a value of .001 microfarad at a rating of 10,000 volts D.C.

If non-shock applications are desired, a magnetic shunt may be introduced between the primary and secondary windings of the transformer 13; and with such an arrangement, as the load across the secondary winding is increased, some of the magnetic flux is shunted to the primary winding, resulting in a decrease in voltage across the secondary. With an arrangement of this type, the output current of the power supply is limited to about two milliamperes when the secondary is completely shorted. Thus, the device could be left in operation indefinitely without detrimental effect thereto. Since magnetic shunts of the type described are known in the art, it is believed unnecessary to illustrate the same or to provide a more detailed description thereof.

As has been brought out before, the power supply is small and compact; and the encapsulation of the components thereof by the dielectric material 12 aids substantially in enabling the unit to be constructed so that the elements thereof are close together, for it effectively isolates one element from another by a barrier that is impervious to the high voltages developed. It has been found that the spacing and orientation of the rectifiers with respect to the transformer, and the capacitors with respect to both the rectifiers and transformer, are important considerations; and the specific arrangement illustrated and described has provided exceptionally fine results.

It may be noted that the transformer is long and narrow, and that the primary and secondary windings thereof have coincident axes and are spaced longitudinally along the composite axis. Since the rectifiers are elongated and extend substantially from end to end of the transformer in adjacency with the peripheral surfaces of the windings thereof, the magnetic flux developed by the transformer encompasses the rectifiers and appears to aid the functioning thereof to the end that the output voltages of the power supply are more accurately achieved and maintained. Furthermore, this same relationship between the transformer and rectifiers causes the rectifier elements to be quickly and uniformly heated from end to end thereof by the operating temperature of the transformer, thereby stabilizing the power supply output voltage and causing the proper output to be rapidly available.

While in the foregoing specification embodiments of the invention have been set forth in considerable detail for purposes of illustration, it will be readily apparent to those skilled in the art that numerous changes may be made in those details without departing from the spirit and principles of the invention.

I claim:

1. In a power supply, an elongated iron core transformer having a primary and a secondary winding wound about said core in axial succession therealong, a plurality of solid state rectifiers of elongated configuration lying adjacent the peripheries of said windings in heat exchange relation therewith and extending along the longitudinal axis thereof in spaced apart relation, a plurality of capacitors each nested between adjacent rectifiers in proximity with the periphery of at least one of said windings, a container enclosing said transformer, rectifiers and capacitors, and a substantially solid dielectric material filling said container and encapsulating the elements therein, said rectifiers and capacitors being connected with the secondary winding of said transformer so as to define a voltage multiplication-rectification circuit.

2. The power supply of claim 1 in which said rectifiers are long, narrow elements and extend substantially from end to end of said windings, and in which said capacitors are thin elements.

3. The power supply of claim 2 in which said rectifiers are selenium components.

4. The power supply structure of claim 3 in which said transformer is equipped with a laminated core of generally rectangular configuration defining a closed magnetic circuit, and in which said primary and secondary windings surround one leg of said core.

5. In a power supply capable of producing a relatively high voltage, low current, D.C. output from a relatively low voltage A.C. input, a power transformer having an elongated, substantially rectangular core provided with a longitudinally extending opening throughout the center portion thereof defining a pair of spaced apart legs interconnected at the respective ends thereof to form a closed magnetic circuit and having also both a primary and secondary winding formed about one leg of said core in axial succession therealong, at least one elongated, longitudinally extending solid state rectifier supported along the periphery of said windings, a plurality of capacitors each lying adjacent the periphery of at least one of said windings, a container enclosing said transformer, rectifier and capacitors with the other of said legs being in substantial juxtaposition with the inner surface of the container, and a substantially solid dielectric material filling said container and encapsulating said transformer, rectifier and capacitors except for the surface of said other leg in juxtaposition with said container, said rectifier and capacitors being connected with the secondary winding of said transformer so as to define a voltage multiplication-rectification circuit.

6. In a power supply capable of producing a relatively high voltage, low current, D.C. output from a relatively low voltage A.C. input, a power transformer having a core defining a substantially closed magnetic circuit and providing an elongated leg equipped with both a primary and secondary winding formed in axial succession therealong, a plurality of solid-state rectifiers supported along the periphery of said windings in substantial adjacency therewith, a plurality of capacitors each supported along the periphery of said windings in substantial adjacency therewith, a container enclosing said transformer, rectifiers and capacitors and being fixedly secured to said core, and a solid-state dielectric material substantially filling said container and encapsulating the components therewithin, said rectifiers and capacitors being connected with the secondary winding of said transformer so as to define a voltage multiplication and rectification circuit.

References Cited in the file of this patent

UNITED STATES PATENTS

| | | |
|---|---|---|
| 1,781,088 | Strobel | Nov. 11, 1930 |
| 2,619,602 | Walker et al. | Nov. 25, 1952 |
| 2,683,766 | Cunningham | July 13, 1954 |
| 2,740,905 | Henderson | Apr. 3, 1956 |
| 2,758,267 | Short | Aug. 7, 1956 |
| 2,792,555 | Mysse | May 14, 1957 |

OTHER REFERENCES

"Analyses of the Voltage-Tripling and Quadrupling Rectifier Circuits," Waidelich et al., Proceedings of the I.R.E., vol. 33, No. 7, July 1945, pp. 449–457 (p. 450 relied on).

"Plastic," Cuming, Electronics, June 1, 1950, pages 66–69.

"Potted Electronic Circuits," Bryan, Radio and Television News, December 1950; pp. 6a to 8a and 27a.